United States Patent
Al-Mousa et al.

(10) Patent No.: US 12,111,916 B2
(45) Date of Patent: Oct. 8, 2024

(54) SQL PROXY ANALYZER TO DETECT AND PREVENT UNAUTHORIZED SQL QUERIES

(71) Applicant: Saudi Arabian Oil Company, Dhahran (SA)

(72) Inventors: Emad Mohammad Al-Mousa, Dammam (SA); Yaser Al-Marhoun, Saihat (SA); Khalid Al-Amoudi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 309 days.

(21) Appl. No.: 17/455,109

(22) Filed: Nov. 16, 2021

(65) Prior Publication Data
US 2023/0153420 A1  May 18, 2023

(51) Int. Cl.
*G06F 21/54* (2013.01)
*G06F 21/60* (2013.01)
*G06F 21/62* (2013.01)
*H04L 67/56* (2022.01)

(52) U.S. Cl.
CPC .......... *G06F 21/54* (2013.01); *G06F 21/602* (2013.01); *G06F 21/6227* (2013.01); *H04L 67/56* (2022.05)

(58) Field of Classification Search
CPC .... G06F 21/54; G06F 21/602; G06F 21/6227; H04L 67/56
See application file for complete search history.

(56) References Cited

U.S. PATENT DOCUMENTS 7,444,331 B1 * 10/2008 Nachenberg ........ G06F 16/2455
7,752,215 B2    7/2010 Dettinger et al.
7,870,120 B2    1/2011 Andreev et al.
(Continued)

FOREIGN PATENT DOCUMENTS

CN    101609493 A1    12/2009
CN    104821949 B2    1/2018

OTHER PUBLICATIONS

Agarwal et al., "An Efficient Technique for finding SQL Injection Using Reverse Proxy Server", IRJET, Sep. 2019, pp. 1564-1569, vol. 06 Issue: 09.
(Continued)

*Primary Examiner* — Nam T Tran
(74) *Attorney, Agent, or Firm* — Leason Ellis LLP (57) ABSTRACT

A proxy apparatus for analyzing database queries in a secure network using a valid-query library that is constructed during an initial period following the deployment of an application. The proxy apparatus receives, in an operational mode, an operational database query from the secure network, generates an identifier for the received operational database query based at least upon a query code of the received operational database query; identifies a source and a destination of the received operation database query and compares the generated identifier, the identified source, and the identified destination to the valid-query library. When the comparing fails to match any entries in the valid-query library, the proxy apparatus terminates the operational database query; and when the comparing step matches an entry in the valid-query library, the proxy apparatus relays the received operational database query based on the destination identification.

14 Claims, 5 Drawing Sheets

(56) References Cited

U.S. PATENT DOCUMENTS

| | | | |
|---|---|---|---|
| 8,046,374 B1* | 10/2011 | Bromwich | G06F 21/552 |
| | | | 707/952 |
| 8,849,793 B2 | 9/2014 | Vexler | |
| 9,436,730 B2* | 9/2016 | Li | G06F 21/554 |
| 9,514,319 B2 | 12/2016 | Mattsson et al. | |
| 10,380,139 B2 | 8/2019 | Adamut | |
| 10,404,744 B2 | 9/2019 | Dinerstein et al. | |
| 10,409,665 B2 | 9/2019 | Steiner et al. | |
| 10,558,641 B2 | 2/2020 | Moysi et al. | |
| 10,637,887 B2 | 4/2020 | Jas et al. | |
| 11,281,770 B2* | 3/2022 | Wilding | G06F 21/6227 |
| 2009/0112805 A1 | 4/2009 | Garbow et al. | |
| 2009/0282480 A1* | 11/2009 | Lee | G06F 21/55 |
| | | | 717/130 |
| 2012/0117644 A1* | 5/2012 | Soeder | G06F 21/6227 |
| | | | 726/22 |
| 2015/0355957 A1* | 12/2015 | Steiner | G06F 21/6227 |
| | | | 714/37 |
| 2016/0036812 A1* | 2/2016 | Rodniansky | G06F 21/6227 |
| | | | 713/170 |
| 2018/0046665 A1 | 2/2018 | Wilding | |
| 2019/0102437 A1* | 4/2019 | Patthak | G06F 16/2453 |
| 2019/0102553 A1* | 4/2019 | Herwadkar | G06F 21/552 |
| 2019/0207974 A1* | 7/2019 | Jas | G06F 21/6227 |
| 2020/0302078 A1* | 9/2020 | Fagan | G06F 21/6227 |
| 2022/0237314 A1* | 7/2022 | Diamant | G06F 21/6227 |

OTHER PUBLICATIONS

Office Action in corresponding SA Application No. 122440613 dated Feb. 5, 2024; 11 pages.

* cited by examiner

SQL PROXY ANALYZER TO DETECT AND PREVENT UNAUTHORIZED SQL QUERIES

FIELD OF THE DISCLOSURE

The present disclosure generally relates to computer network security systems. More specifically, the present disclosure is directed to a proxy apparatus adapted to monitor database queries within a secure network to detect unauthorized database queries via undetected network intrusions.

BACKGROUND OF THE DISCLOSURE

Database Management Systems (DBMS's) usually store the most confidential and sensitive information of a corporation in structures that facilitate well-defined and standardized access and manipulation. This contributes to the agility and accuracy of the applications that need the information collected in those databases. DBMS's implement a variety of security multi-layered models to protect data and other assets (e.g. business logic code, credentials) from unauthorized access and/or other malicious destructive attempts. However, the sophistication and frequency of cyberattacks directed at DBMS's have risen dramatically. In addition, cyberattack techniques have become greatly diversified with more intelligence and stealth invested on them than ever before. One of the ways that can be deployed to counter these attacks is "Threat Detection." It is this discipline that has been developed to predict and intercept threats prior to their implanting any damage (e.g. data center major interruptions) or theft (data, identity, etc.) against IT components.

SUMMARY OF THE DISCLOSURE

The present disclosure relates to a threat detection methodology used in Relational Database Management systems to anticipate attacks that are intended to compromise an organization's data using unsolicited database queries, such as Structured Query Language (SQL) queries.

In view of the above and the crucial importance of protecting confidential data from any such rogue SQL transactions against databases, the present disclosure provides a technique for monitoring database transactions between application servers and information systems to detect anomalous queries that may otherwise be structurally valid queries.

The present disclosure is described in connection with a SQL Analyzer, which is a proxy server between an application server and a database system. The proxy server reads SQL queries and tokenize them with unique signatures (e.g. SQL Global Unique Identifier) during an initial training period to identify them as legitimate application transactions when an application is first deployed at the application server. Thereafter, the only transactions processed for any application are those authorized by the proxy. This proxy mechanism provides an additional shield against any rogue SQL queries attempting to retrieve data from the database system through an application's legitimate interfaces. The proxy server terminates rogue queries and, thus, malicious data exfiltration can be prevented. The present disclosure can be applied in other environments besides SQL, which is provided as an example of one implementation, and which is not limiting of the scope of the invention defined by the claims included with this disclosure.

According to an exemplary embodiment of the present disclosure, a proxy apparatus for analyzing database queries in a secure network, comprises a computer network interface to the secure network; one or more processing devices operatively connected to the computer network interface; and one or more memory storage devices operatively connected to the one or more processing devices and having stored thereon machine-readable instructions that cause the one or more processing devices, when executed, to receive, in an initial training mode, a plurality of training database queries from one or more computing apparatuses in the secure network via the computer network interface; identify at least a query source, a destination database, and a valid-query code for each of the plurality of training database queries, said valid-query code being identified based on one or more predetermined code libraries; assign a unique identifier for each unique valid-query code identified from the plurality of training database queries, said unique identifier being generated based at least upon a predetermined algorithm; record, in the one or more memory storage devices, the assigned unique identifier, along with one or more unique combinations of the query source and the destination database associated with the each unique valid-query code, to a valid-query library; receive, in an operational mode, an operational database query from the secure network via the computer network interface; generate an identifier for the received operational database query based at least upon a query code of the received operational database query; identify a source and a destination of the received operation database query; compare the generated identifier, the identified source, and the identified destination to the valid-query library; when the comparison fails to match any entries in the valid-query library, terminate the operational database query; and when the comparison matches an entry in the valid-query library, relay the received operational database query based on the destination identification via the computer network interface.

According to an embodiment, the processor configured to identify the valid-query code for each of the plurality of training database queries is further configured to generate an application programming interface (API) to an application at the one or more computing apparatuses corresponding to the respective training database query; scan an application code portion associated with the respective training database query via the generated API; retrieve the one or more predetermined code libraries; and construct the valid-query code based on the scanned application code portion and the retrieved one or more predetermined code libraries.

According to an embodiment, the processor configured to generate the identifier for the received operational database query is further configured to generate an application programming interface (API) to an application corresponding to the received operational database query; scan an application code portion associated with the received operational database query via the generated API; retrieve the one or more predetermined code libraries; and construct the query code of the received operational database query based on the scanned application code portion and the retrieved one or more predetermined code libraries.

According to an embodiment, the proxy apparatus comprises a machine readable instruction stored on the one or more memory storage devices for causing, when executed, the one or more processing devices to, when the comparison fails to match any entries in the valid-query library, record, in a rejected query log, forensic information on the received operational database query, the forensic information comprising the query code, the identified source, and the identified destination of the received operation database query; and transmit the rejected query log to a threat assessment apparatus.

According to an embodiment, the identified source comprises an internet protocol (IP) address and an account name associated with the received operation database query.

According to an embodiment, the proxy apparatus comprises a machine readable instruction stored on the one or more memory storage devices for causing, when executed, the one or more processing devices to record, in an exception mode, one or more updated unique identifiers corresponding to an application update to the valid-query library, wherein the comparison comprises comparing a subsequently generated identifier of a subsequent operational database query that corresponds to an updated query code of the application update to the one or more updated unique identifiers.

According to an exemplary embodiment of the present disclosure, a method of a proxy apparatus for analyzing database queries in a secure network, comprises receiving, by the proxy apparatus in an initial training mode, a plurality of training database queries from one or more computing apparatuses in the secure network via a computer network interface; identifying, by the proxy apparatus, at least a query source, a destination database, and a valid-query code for each of the plurality of training database queries, said valid-query code being identified based on one or more predetermined code libraries; assigning, by the proxy apparatus, a unique identifier for each unique valid-query code identified from the plurality of training database queries, said unique identifier being generated based at least upon a predetermined algorithm; recording, in one or more memory storage devices, the assigned unique identifier, along with one or more unique combinations of the query source and the destination database associated with the each unique valid-query code, to a valid-query library; receiving, by the proxy apparatus in an operational mode, an operational database query from the secure network via the computer network interface; generating, by the proxy apparatus, an identifier for the received operational database query based at least upon a query code of the received operational database query; identifying, by the proxy apparatus, a source and a destination of the received operation database query; comparing, by the proxy apparatus, the generated identifier, the identified source, and the identified destination to the valid-query library; when the comparing fails to match any entries in the valid-query library, terminating, by the proxy apparatus, the operational database query; and when the comparing matches an entry in the valid-query library, relaying, by the proxy apparatus, the received operational database query based on the destination identification via the computer network interface.

According to an embodiment, the identifying of the valid-query code for each of the plurality of training database queries comprises generating an application programming interface (API) to an application at the one or more computing apparatuses corresponding to the respective training database query; scanning an application code portion associated with the respective training database query via the generated API; retrieving the one or more predetermined code libraries; and constructing the valid-query code based on the scanned application code portion and the retrieved one or more predetermined code libraries.

According to an embodiment, the generating of the identifier for the received operational database query comprises generating an application programming interface (API) to an application corresponding to the received operational database query; scanning an application code portion associated with the received operational database query via the generated API; retrieving the one or more predetermined code libraries; and constructing the query code of the received operational database query based on the scanned application code portion and the retrieved one or more predetermined code libraries.

According to an embodiment, when the comparing fails to match any entries in the valid-query library, recording, in a rejected query log, forensic information on the received operational database query, the forensic information comprising the query code, the identified source, and the identified destination of the received operation database query; and transmitting, by the proxy apparatus, the rejected query log to a threat assessment apparatus.

According to an embodiment, the identified source comprises an internet protocol (IP) address and an account name associated with the received operation database query.

According to an embodiment, the method of the proxy apparatus further comprises recording, by the proxy apparatus in an exception mode, one or more updated unique identifiers corresponding to an application update to the valid-query library, wherein the comparing compares a subsequently generated identifier of a subsequent operational database query that corresponds to an updated query code of the application update to the one or more updated unique identifiers.

BRIEF DESCRIPTION OF THE DRAWINGS

Various exemplary embodiments of this invention will be described in detail, with reference to the following figures, wherein.

DETAILED DESCRIPTION OF CERTAIN EMBODIMENTS CONSISTENT WITH THE DISCLOSURE

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures. As used throughout this application, the words "system" and "server" can be used interchangeably with "device," "apparatus," and "network," respectively, where a system or server can be embodied by a singular apparatus, device, and the like, and be comprised in or comprise a computer-implemented network of plural entities, apparatuses, devices, etc. As used throughout this application, the term "secure network" means any system, server, device, apparatus, and network to which access is limited and secured at least by a credential authentication. As used throughout this application, the term "SQL" can be used interchangeably with "database," where an exemplary embodiment is disclosed herein in connection with queries in the Structured Query Language (SQL) standard for retrieving data from a relational database management system (RDBMS). One of ordinary skill in the art can appreciate that features related to such queries are equally applicable to database queries conforming to other language standards without departing from the spirit and scope of the present disclosure.

The present disclosure relates to a computer-implemented process for monitoring database queries by applications within a secure network based a query whitelist established by training at deployment of the applications. It is an object of the present disclosure to provide a technological solution to the long felt need in improving data security for secure networks against unconventional intrusions.

Advantageously, the database query monitoring technique of the present disclosure can accurately detect unexpected, and possibly intrusive, database queries that are otherwise structurally valid queries.

Figure 1:
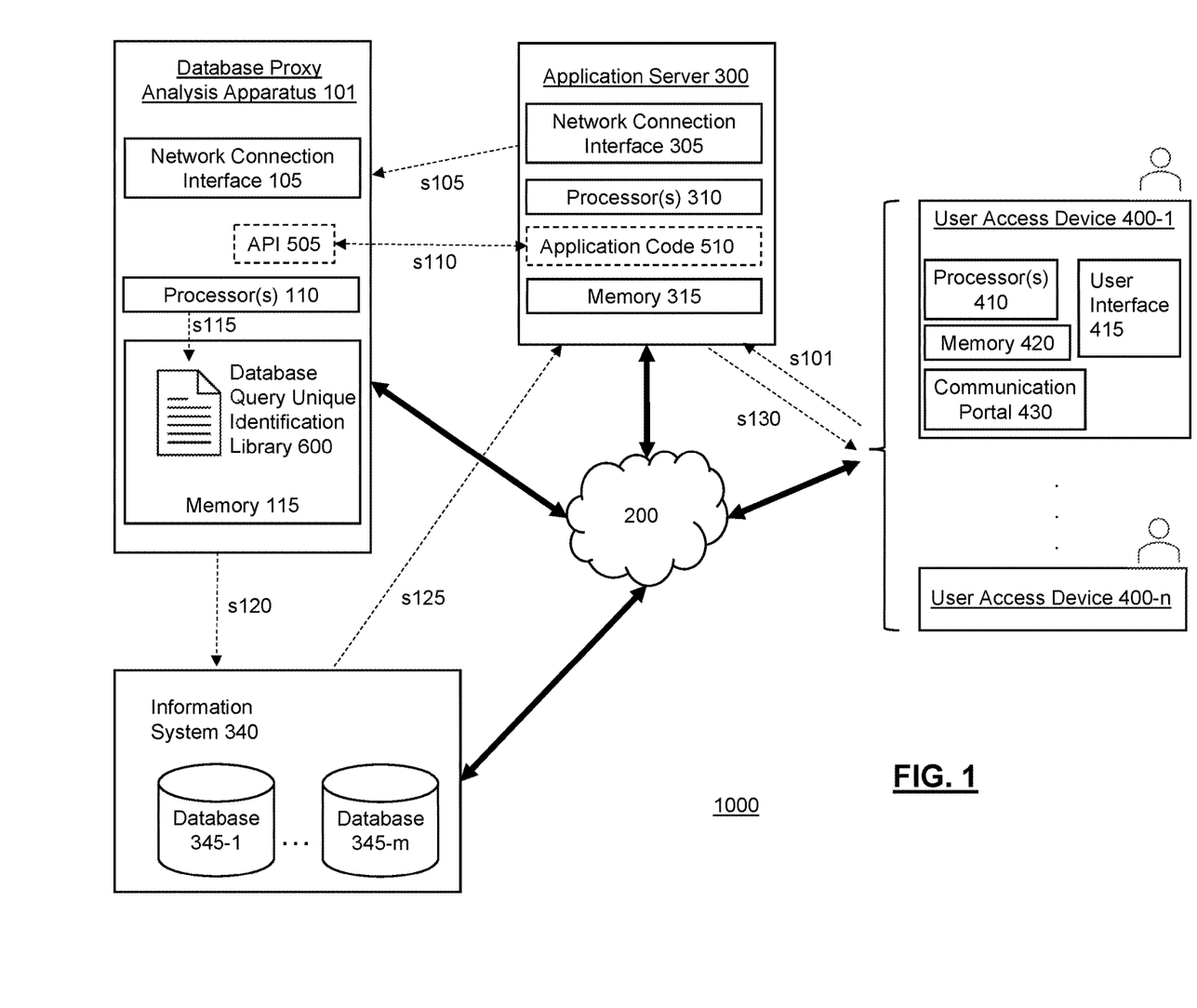
FIG. 1 is a schematic diagram illustrating the operations of an initial training mode for a database proxy analysis apparatus in accordance with an exemplary embodiment of the present disclosure.

FIG. 1 is a schematic diagram illustrating an implementation of a database proxy analysis apparatus 101 in an enterprise system/network 200 according to an exemplary embodiment of the present disclosure. Enterprise network 200 can be associated with any enterprise organization and database proxy analysis apparatus 101 is communicatively connected to network 200 for monitoring database queries that are transmitted from application server 300 to information system 340, which respectively form additional elements of network 200. Communications systems for facilitating network 200 include hardware (e.g., hardware for wired and/or wireless connections) and software. Wired connections can use coaxial cable, fiber, copper wire (such as twisted pair copper wire), and/or combinations thereof, to name a few. Wired connections can be provided through Ethernet ports, USB ports, and/or other data ports to name a few. Wireless connections can include Bluetooth, Bluetooth Low Energy, Wi-Fi, radio, satellite, infrared connections, ZigBee communication protocols, to name a few. In embodiments, cellular or cellular data connections and protocols (e.g., digital cellular, PCS, CDPD, GPRS, EDGE, CDMA2000, 1×RTT, RFC 1149, Ev-DO, HSPA, UMTS, 3G, 4G, LTE, 5G, and/or 6 G to name a few) can be included.

Communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Accordingly, network 200 can be accessed, for example, using Transfer Control Protocol and Internet Protocol ("TCP/IP") (e.g., any of the protocols used in each of the TCP/IP layers) and suitable application layer protocols.

According to an exemplary embodiment of the present disclosure, network 200 is a secure, private, enterprise network comprised of switches (not shown), routers (not shown), and other computing devices (not shown) for facilitating communications and data exchanges among servers, such as application server 300 and information system 340, and clients, such as user devices 400-1 . . . 400-n, while conforming to the above-described connections and protocols as understood by those of ordinary skill in the art.

In embodiments, data communications and exchanges among the elements of network 200 can be encrypted. In embodiments, network 200 can be embodied by one or more private shared IP networks, corporate shared packet networks, Storage Area Networks (SAN), and/or dedicated communications conduits or circuits based on dedicated channels, such as Synchronous Digital Hierarchy (SDH), Synchronous Optical Networking SONET, Wave Division Multiplexing, dedicated cable, Digital Subscriber Line (DSL), dedicated fiber, or various forms of other non-shared IP packet networks as understood by those of ordinary skill in the art. In embodiments, network 200 can be further secured by firewalls (not shown) that prevent external intrusions into elements of network 200. In embodiments, network 200 can also implement Intrusion Detection Systems (IDS) as a security infrastructure. As an example, the Simple Network Management Protocol (SNMP) integrated with security mechanisms can be used with a Network Management System (NMS), or an SNMP manager.

Despite such security measures, attacks can still take place by, for example, social engineering—such as, credential hijacking, phishing, and the like—that result in intruders impersonating a valid user of network 200 to extract valuable proprietary information that is kept at information system 340. Accordingly, the present disclosure provides a technique for monitoring queries from application server 300, which are initiated by users at user access devices 400-1 . . . 400-n, to information system 340 and for detecting anomalies to prevent spoofed access to network 200 from gaining access to sensitive data maintained at information system 340.

According to an exemplary embodiment, database proxy analysis apparatus 101 is a computing apparatus, such as a server apparatus, desktop computer, and the like—comprised of a network connection interface 105 for communicatively connecting to network 200, one or more processor(s) 110, and memory 115.

Network connection interface 105 can use any of the previously mentioned exemplary communications protocols. According to an exemplary embodiment, network connection interface 105 comprises one or more universal serial bus ("USB") ports, one or more Ethernet or broadband ports, and/or any other type of hardwire access port to communicate with network 200 and, accordingly, application server 300 and information system 340.

One or more processor(s) 110 can include any suitable processing circuitry capable of controlling operations and functionality of database proxy analysis apparatus 101, as well as facilitating communications between various components within database proxy analysis apparatus 101. In some embodiments, processor(s) 110 can include a central processing unit ("CPU"), a graphic processing unit ("GPU"), one or more microprocessors, a digital signal processor, or any other type of processor, or any combination thereof. In some embodiments, the functionality of processor(s) 110 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 110 can include its own local memory, which can store program systems, program data, and/or one or more operating systems.

Memory 115 can include one or more types of storage mediums, such as any volatile or non-volatile memory, or any removable or non-removable memory implemented in any suitable manner to store data for database proxy analysis apparatus 101. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 115 can be implemented as computer-readable storage media ("CRSM"), which can be any available physical media accessible by processor(s) 110 to execute one or more instructions stored within memory 115. According to an exemplary embodiment, one or more applications corresponding to the database query monitoring process steps described in further detail below are stored in memory 115 and executed by processor(s) 110.

Information system 340 incorporates databases 345-1 . . . 345-*m* that embodies servers and corresponding storage media for storing data for enterprise network 200 as will be understood by one of ordinary skill in the art. Exemplary storage media for data storage 345 correspond to those described above with respect to memory 115, which will not be repeated here. According to an exemplary embodiment, information system 340 incorporates databases 345-1 . . . 345*m* and is a relational database management system (RDBMS) that employs the Structured Query Language (SQL) standard as its command-and-control language. In embodiments, information system 340 can be comprised of one or more database servers that support Oracle SQL, NoSQL, NewSQL, PostgreSQL, MySQL, Microsoft SQL Server, Sybase ASE, SAP HANA, DB2, and the like. Information system 340 incorporates a network connection interface (not shown) for communications with network 200 and exemplary implements of which can include those described above with respect to network connection interface 105, which will not be repeated here.

Application server 300 is comprised of a computing apparatus adapted to host one or more applications that are accessible and executable over network 200 by authorized users at user access devices 400-1 . . . 400-*n*. In accordance with an exemplary embodiment, application server 300 includes network connection interface 305, processor(s) 310, and memory 315. Network connection interface 305 can use any of the previously mentioned exemplary communications protocols for communicatively connecting to network 200. Exemplary implements of network connection interface 305 can include those described above with respect to network connection interface 105, which will not be repeated here. One or more processor(s) 310 can include any suitable processing circuitry capable of controlling operations and functionality of application server 300, as well as facilitating communications between various components within application server 300. Exemplary implements of processor(s) 310 can include those described above with respect to processor(s) 110, which will not be repeated here. Memory 315 can include one or more types of storage mediums, such as any volatile or non-volatile memory, or any removable or non-removable memory implemented in any suitable manner to store data for application server 300, exemplary implements of which can include those described above with respect to memory 115 and will be not repeated here. In embodiments, executable portions of applications maintained at application server 300 can be offloaded to user access devices 400-1 . . . 400-*n*. For example, graphical user interface renderings and the like can be locally executed at user access devices 400-1 . . . 400-*n*.

User access device 400-1 . . . 400-*n* can be any computing device and/or data processing apparatus capable of embodying the systems and/or methods described herein and can include, for each corresponding user, any suitable type of electronic device including, but are not limited to, workstations, desktop computers, mobile computers (e.g., laptops, ultrabooks), mobile phones, portable computing devices, such as smart phones, tablets, personal display devices, personal digital assistants ("PDAs"), virtual reality devices, wearable devices (e.g., watches), to name a few, with network access that is uniquely identifiable by Internet Protocol (IP) addresses and Media Access Control (MAC) identifiers.

Figure 2:
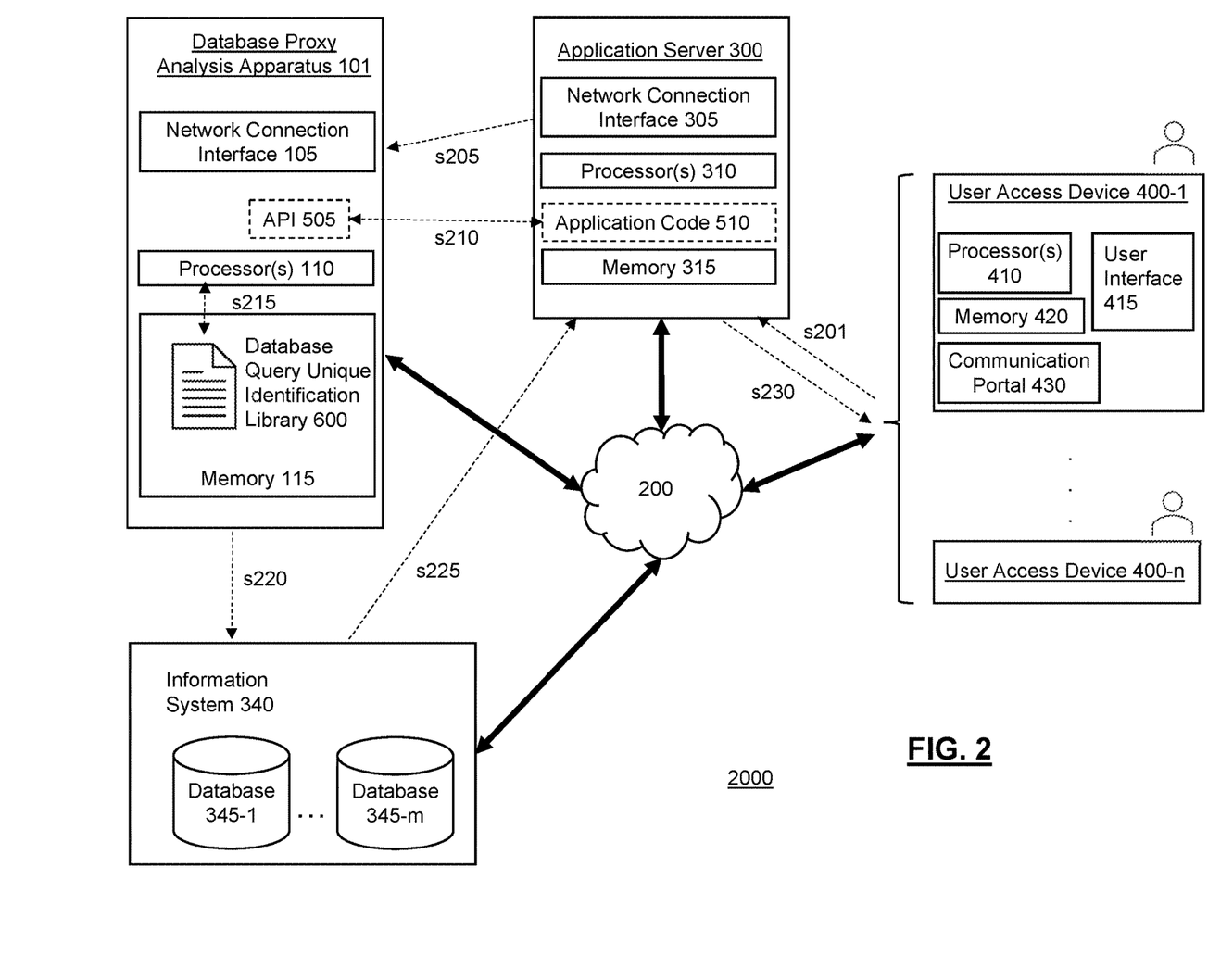
FIG. 2 is a schematic diagram illustrating the operations of a legitimate database query determination during an operational mode for a database proxy analysis apparatus in accordance with an exemplary embodiment of the present disclosure.

User access device 400-1 is illustrated in FIGS. 1-2 as an exemplary schematic arrangement for user access devices 400-1 . . . 400-*n* that provide users with access to network 200 upon appropriate authentications. As shown in FIGS. 1-2, user access device 400-1 includes processor(s) 410, memory 420, communication portal 430, and user interface 415. Processor(s) 410, memory 420, and communication portal 430 can be implemented in accordance with the exemplary implementations for processor(s) 110, memory 115, and network connection interface 105, respectively, and will not be repeated here. User interface 415 is operatively connected to processor(s) 410 and can include one or more input or output device(s), such as switch(es), button(s), key(s), a touch screen, a display, microphone, camera(s), sensor(s), etc. as would be understood in the art of electronic computing devices.

In some embodiments, user access devices 400-1 . . . 400-*n* can include one or more antennas to facilitate wireless communications with a network using various wireless technologies (e.g., Wi-Fi, Bluetooth, radiofrequency, etc.). In embodiments, one or more of user access devices 400-1 . . . 400-*n* can access network 200 via a virtual private network ("VPN") tunnel through an external network (not shown). Such tunnels can employ Layer 2 Tunneling Protocol (L2TP) and the like.

Database proxy analysis apparatus 101 of the present disclosure, which can embody a SQL proxy analyzer server, is a middleware between the application server 300 and the database system 340. The purpose of the SQL proxy analyzer is to intercept any illegal SQL queries generated from the application server 340 after a breach occurrence on the application layer side. It is recognized in the present disclosure that an attacker after breaching the application server 300 is likely to execute SQL statements that do not conform to regularly expected transactions from an application. Accordingly, SQL queries from applications executed at application server 300 are monitored and examined by database proxy analysis application 101. Queries that are not part of a predefined set of SQL queries are terminated by the proxy analyzer 101 and data is prevented from being returned from the database system 340.

FIG. 1 illustrates an initial training mode process 1000, which can alternatively be referred to as a whitelist "population mode" process, for database proxy analysis apparatus 101 when an application is newly deployed at application server 300. Process 1000 operatively populates a predefined set of expected SQL queries for each newly deployed application for monitoring subsequent transactions in connection with the application(s). When a new application is deployed at application server 300, database proxy analysis apparatus 101 is placed into the training mode, or population mode, with respect to the newly deployed application for a predetermined period of time to learn the valid database queries that are to be generated by the application. According to an exemplary embodiment, the predetermined period is a prescribed number of days, after which database proxy analysis apparatus 101 enters an operation mode with respect to the application as will be described in further detail below.

In a newly deployed application, the application uses a database application-account, and the database application-account is assigned full DML (Data Manipulation Language) access—such as select, insert, update, and delete—in database objects—such as tables and views—in addition to execute permissions on SQL code procedures. As illustrated in FIG. 1, process 1000 according to an exemplary embodiment is initiated with step s101, where a user of one of the user access devices 400-1 . . . 400-1 accesses application server 300 via network 200 to execute the newly deployed application. As an example, step s101 can be embodied by an instruction issued to application server 300 to perform a function of the application that comprises a database query for retrieving information from information system 340. Next, at step s105, application server 300 generates and transmits a database query—a training database query according to the instruction of step s101 and the corresponding application via network 200 to information system 340, which database query is intercepted and received by database proxy analysis apparatus 101 as shown in FIG. 1.

According to an exemplary embodiment and as illustrated by step s110 of FIG. 1, database proxy analysis apparatus 101 maintains an application programming interface (API) 505 directly to the application code 510 that is deployed at application server 300. Consequently, database proxy analysis apparatus 101 operatively monitors the executed application code 510 directly through API 505 to generate a corresponding database query. API 505 can be implemented with different API connectors for different database access methods, such as Open Database Connectivity (ODBC), ADO.net, and the like.

In accordance with an exemplary embodiment, network 200 incorporates network encryption to ensure data transmitted over the wire are encrypted between the application at application server 300 and the database system at information system 340. Thus, database proxy analysis apparatus 101 (SQL Proxy Analyzer) can incorporate a decryption key adapted to read and view the generated SQL statements produced by the application at application server 300. Alternatively, API 505 provides for direct inspection of application code 510. Thus, advantageously, API 505 eliminates the need for maintaining a decryption key at database proxy analysis apparatus 101 for interpreting encrypted data communications from application server 300.

In accordance with an exemplary embodiment of the present disclosure, database proxy analysis apparatus 101 maintains one or more predetermined database query code libraries (not shown) in memory 115 for generating valid database queries in correspondence with queries transmitted by applications at application server 300. As an example, in the .net framework, System.Data.SqlClient can be the library used for initiating and constructing SQL queries in the application code. In embodiments, the one or more predetermined database query code libraries (not shown) can be maintained in memory 315 at application server 300. Thus, database proxy analysis apparatus 101 retrieves or generates a valid database query based on the application code inspection at step s110 via API 505 and based on referencing the one or more predetermined database query code libraries (not shown) at memory 115. In embodiments, the one or more predetermined database query code libraries (not shown) are retrieved from application server 300 as needed. Correspondingly, as illustrated by step s115, a unique signature (e.g., SQL Global Unique Identifier) is generated for the valid (training) database query and stored as an entry in a database query unique identification library 600 that is maintained in memory 115 of database proxy analysis apparatus 101. According to an exemplary embodiment, the unique signature is generated based on a checksum of the final valid database query code. Thus, database query unique identification library 600 forms a valid-query library for the newly deployed application at application server 300 through the initial training process 1000.

Figure 4:
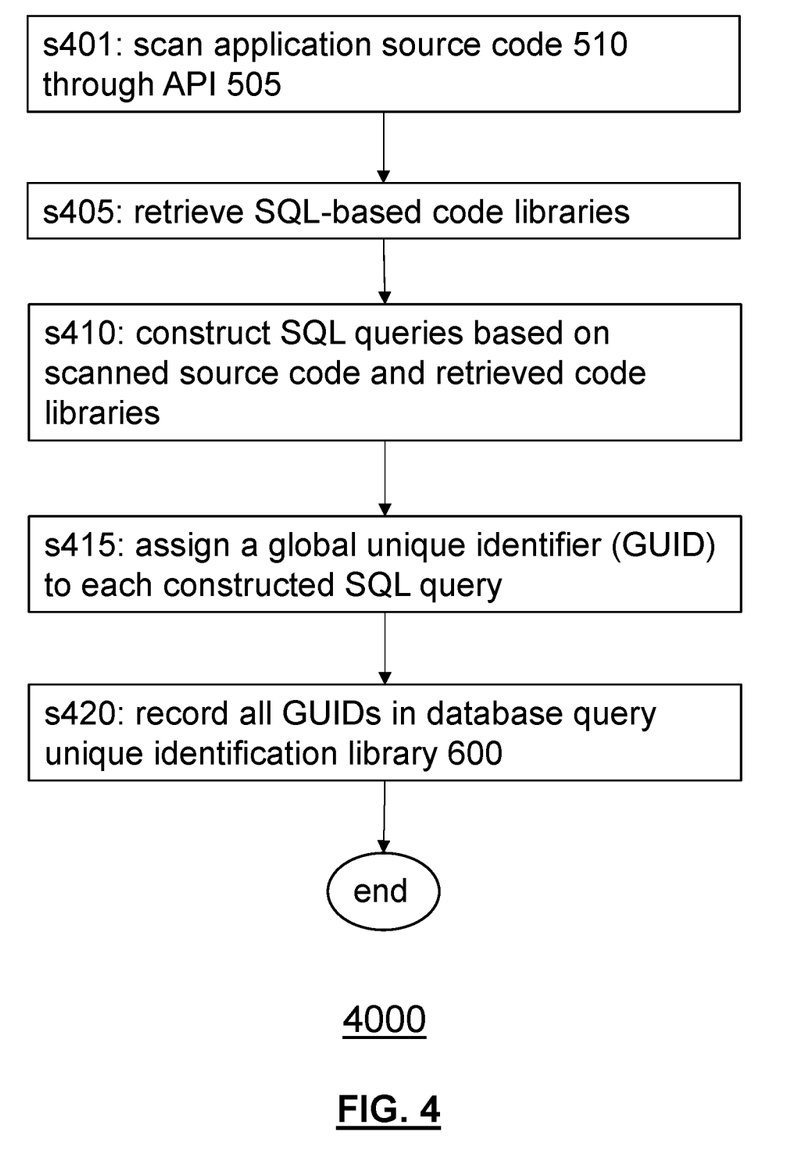
FIG. 4 is a flow diagram illustrating a process for generating and recording a global unique identifier (GUID) in connection with a training database query during an initial training mode for a database proxy analysis apparatus according to an exemplary embodiment of the present disclosure.

According to an exemplary embodiment, steps s110 and s115 shown in FIG. 1 are implemented by process 4000 shown in FIG. 4 executed at database proxy analysis apparatus 101. As shown in FIG. 4, process 4000 initiates with step s401, which corresponds in functionality with step s110 shown in FIG. 1. At step s401, database proxy analysis apparatus 101 scans the application code 510 at application server 300 via API 505. According to an exemplary embodiment, the code portion(s) corresponding to the database query(ies) received from application server 300 (step s105 of FIG. 1) is(are) scanned to determine and verify the valid-query code(s). Next, at step s405, database proxy analysis apparatus 101 retrieves database code libraries from either memory 115 or memory 315. In accordance with an exemplary embodiment, the code libraries are SQL-based code libraries that define the valid and legal SQL queries in connection with information system 340. Database proxy analysis apparatus 101 then, at step s410, constructs one or more SQL queries for the newly deployed application at application server 300 based on the received query(ies) (at step s105 of FIG. 1).

The constructed valid one or more SQL queries are each assigned a global unique identifier (GUID), at step s415. According to an exemplary embodiment, GUID s are generated and assigned based on the checksum values of the constructed valid SQL query codes and a predetermined hashing algorithm.

Process 4000 concludes with step s420, which corresponds in functionality with step s115 shown in FIG. 1. At step s420, each GUID is recorded as an entry in a database query unique identification library 600 maintained at memory 115 of database proxy analysis apparatus 101. Table 1 below lists an example of a GUID entry maintained in database query unique identification library 600. As illustrated in Table 1, each entry includes an application at application server 300 (database application account), a database query in connection with the application (SQL Query), and a corresponding GUID (Signature for the SQL Query) that is generated according to an exemplary embodiment of the present disclosure.

TABLE 1

| Database Application Account | SQL Query | Signature for the SQL Query |
|---|---|---|
| sales_app | Select sales_order,sales_date from sales_records where sales_region= 'Saudi Arabia'; | 2 Ahy6icq67flnmlr |

According to an exemplary embodiment, step s420 further incorporates recording circumstantial parameters for each training database query received from application server 300 during the aforementioned training mode period to provide additional details on circumstances for valid and authorized database queries to information system 340. As an example, an application set of IP address and ports and a corresponding destination database (IP address, Port) (not shown) are associated with each GUID entry in memory 115 for later analysis and comparison in an operational mode of database proxy analysis apparatus 101. In embodiments, the circumstantial parameters can be one or more unique combinations of a query source and a destination database associated with each GUID. In embodiments, the circumstantial parameters can include time of year, day of week, time of day, execution frequency within a predefined time window, user account, user department, user access device (400) identification, access mode, and the like. As a result, logically valid database queries that are generated under unexpected circumstances can be detected and prevented from extracting data from information system 340.

Referring back to FIG. 1, process 1000 next proceeds to step s120, where database proxy analysis apparatus 101 forwards the constructed valid one or more SQL queries to information system 340 for processing and execution. Next, at step s125, information system 340 returns the appropriate data response(s) to the constructed valid SQL queries to application server 300. Process 1000 concludes with step s130, where application server 300 issues a response to one or more of user access devices 400-1 . . . 400-n in accordance with the instruction received at step s101.

Thus, as illustrated in FIGS. 1 and 4, at the initial stage of application deployment, the database proxy analysis apparatus (SQL proxy analyzer) 101 tracks and assigns a unique signature (SQL Global Unique Identifier GUID) for each SQL transaction running from the application and going to the database system—i.e., information system 340. This leads to a library of a predefined legitimate SQL queries for the application. According to an exemplary embodiment of the present disclosure, every application that is executable on application server 300 is initialized by processes 1000 and 4000 to be associated with a predefined set of GUIDs at database proxy analysis apparatus 101.

FIG. 2 is a schematic diagram illustrating an operational process 2000 for analyzing and validating an authorized database query by database proxy analysis apparatus 101. Database proxy analysis apparatus 101 enters an operational mode after training mode process 1000 shown in FIG. 1 has been completed. Process 1000 for a newly deployed application is executed for a predetermined period of time for database query unique identification library 600 to be appropriately populated with valid SQL queries. According to an exemplary embodiment, the predetermined period is a particular (prescribed) number of days, after which database proxy analysis apparatus 101 enters an operational mode with respect to the application.

As illustrated in FIG. 2, process 2000 according to an exemplary embodiment is initiated with step s201, where a user of one of the user access devices 400-1 . . . 400-n accesses application server 300 via network 200 to execute an application that has completed process 1000. As an example, step s201 can be embodied by an instruction issued to application server 300 to perform a function of the application that comprises a database query for retrieving information from information system 340. Next, at step s205, application server 300 generates and transmits a database query—an operational database query—according to the instruction of step s201 and the corresponding application via network 200 to information system 340, which database query is intercepted and received by database proxy analysis apparatus 101 as shown in FIG. 2.

According to an exemplary embodiment and as illustrated by step s210 of FIG. 2, database proxy analysis apparatus 101 maintains an application programming interface (API) 505 directly to the application code 510 that is deployed at application server 300. Consequently, database proxy analysis apparatus 101 operatively monitors the executed application code 510 directly through API 505 to generate a corresponding database query. As described with reference to FIG. 1, database proxy analysis apparatus 101 maintains one or more predetermined database query code libraries (not shown) in memory 115 for generating valid database queries in correspondence with queries transmitted by applications at application server 300. In embodiments, the one or more predetermined database query code libraries (not shown) can be maintained in memory 315 at application server 300. Thus, database proxy analysis apparatus 101 retrieves or generates a valid database query based on the application code inspection at step s210 via API 505 and based on referencing the one or more predetermined database query code libraries (not shown) at memory 115. In embodiments, the one or more predetermined database query code libraries (not shown) are retrieved from application server 300 as needed. Correspondingly, as illustrated by step s215, a unique signature (e.g., GUID) is generated for the valid (operational) database query and matched against the recorded GUID entries in database query unique identification library 600 that is maintained in memory 115 of database proxy analysis apparatus 101. According to an exemplary embodiment, the unique signature is generated based on a checksum of the final valid database query code and a predetermined hashing algorithm.

Process 2000 of FIG. 2 illustrates an authorized query where the matching of step s215 results in the operational database query matching an entry in database query unique identification library 600. According to an exemplary embodiment, the matching of step s215 further incorporates matching circumstantial parameters of the database query to confirm that the query is an expected and authorized query. For instance, step s215 further incorporates matching a source IP address, source port, destination IP address, and destination port with an application set of IP address and ports and a corresponding destination database (IP address, Port) associated with the matched GUID.

Upon matching the GUID and the circumstantial parameters at step s215, process 2000 proceeds to step s220, where database proxy analysis apparatus 101 forwards the matched operational SQL query to information system 340 for processing and execution. Next, at step s225, information system 340 returns the appropriate data response(s) to the matched valid SQL query to application server 300. Process 2000 concludes with step s230, where application server 300 issues a response to one or more of user access devices 400-1 . . . 400-n in accordance with the instruction received at step s201.

Figure 3:
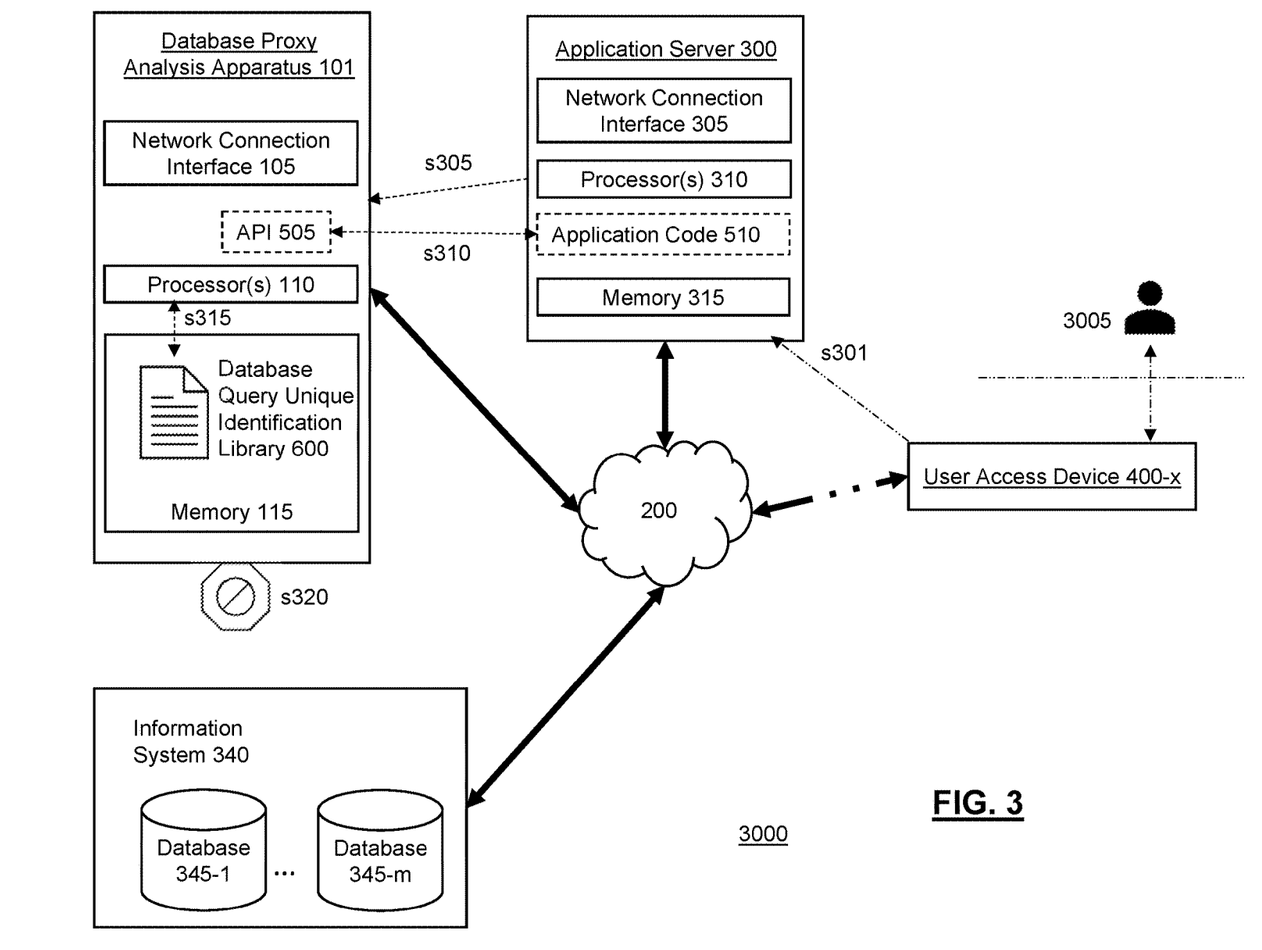
FIG. 3 is a schematic diagram illustrating the operations of an illegitimate database query determination during an operational mode for a database proxy analysis apparatus in accordance with an exemplary embodiment of the present disclosure.

FIG. 3 is a schematic diagram illustrating an operational process 3000 for analyzing and rejecting an unauthorized database query by database proxy analysis apparatus 101. Database proxy analysis apparatus 101 enters an operational mode after training mode process 1000 shown in FIG. 1 has been completed.

As illustrated in FIG. 3, process 3000 according to an exemplary embodiment is initiated with step s301, where an intruder 3005 uses a compromised user access device 400-$x$ to access application server 300 via network 200 to execute an application that has completed process 1000. As an example, step s301 can be embodied by an instruction issued to application server 300 to perform a function of the application that comprises a database query for retrieving information from information system 340. Next, at step s305, application server 300 generates and transmits a database query—an operational database query—according to the instruction of step s301 and the corresponding application via network 200 to information system 340, which database query is intercepted and received by database proxy analysis apparatus 101 as shown in FIG. 3.

According to an exemplary embodiment and as illustrated by step s310 of FIG. 3, database proxy analysis apparatus 101 maintains an application programming interface (API) 505 directly to the application code 510 that is deployed at application server 300. Consequently, database proxy analysis apparatus 101 operatively monitors the executed application code 510 directly through API 505 to generate a corresponding database query. As described with reference to FIG. 1, database proxy analysis apparatus 101 maintains one or more predetermined database query code libraries (not shown) in memory 115 for generating valid database queries in correspondence with queries transmitted by applications at application server 300. In embodiments, the one or more predetermined database query code libraries (not shown) can be maintained in memory 315 at application server 300. Thus, database proxy analysis apparatus 101 retrieves or generates a valid database query based on the application code inspection at step s310 via API 505 and based on referencing the one or more predetermined database query code libraries (not shown) at memory 115. In embodiments, the one or more predetermined database query code libraries (not shown) are retrieved from application server 300 as needed. Correspondingly, as illustrated by step s315, a unique signature (e.g., GUID) is generated for the valid (operational) database query and matched against the recorded GUID entries in database query unique identification library 600 that is maintained in memory 115 of database proxy analysis apparatus 101. According to an exemplary embodiment, the unique signature is generated based on a checksum of the final valid database query code and a predetermined hashing algorithm.

Process 3000 of FIG. 3 illustrates an unauthorized query where the matching of step s315 fails. According to an exemplary embodiment, the failure can be a failure to match a GUID in database query unique identification library 600 or a failure to match recorded circumstantial parameters after matching a GUID. In correspondence with processes 1000 and 2000, the matching of step s315 further incorporates matching circumstantial parameters of the database query to confirm that the query is an expected and authorized query. For instance, step s315 further incorporates matching a source IP address, source port, destination IP address, and destination port with an application set of IP address and ports and a corresponding destination database (IP address, Port) associated with a matched GUID.

Accordingly, any failure at step s315 results in database proxy analysis apparatus 101 terminating the database query initiated at step s301, as illustrated by step s320 in FIG. 3. Thus, the unauthorized query by intruder 3005 fails to reach information system 340. In embodiments, process 3000 can further include, in conjunction with termination step s320, issuing an error message and/or a termination instruction to application server 300 to terminate communication with user access device 400-$x$, alerting a network security entity (not shown) at secure network 200 regarding the GUID and the circumstantial parameters as forensic information of the failed database query, recording the failure and associated forensic information in a log (e.g., "rejected query log") maintained at memory 115, to name a few. In accordance with an exemplary embodiment, GUID match failures and associated forensic information are audited and recorded in a rejected query log for future forensic reference. The auditing information includes, for example, source IP address, Account Name, and Time stamp of the event occurrence, and the number of times the query was executed. This information is integrated with STEM (Security Information and Event Management) solutions for "Threat Intelligence" services that collect indicators of compromise (IoC) by sifting through alert logs generated. In accordance with an exemplary embodiment, the rejected query log is transmitted periodically to a threat assessment apparatus (not shown) for forensic analysis. Advantageously, the database query proxy analyzer functionality of the present disclosure aids in threat intelligence and threat hunting processes to identify any compromise/breach in the infrastructure for accessing network 200 and information system 340.

Figure 5:
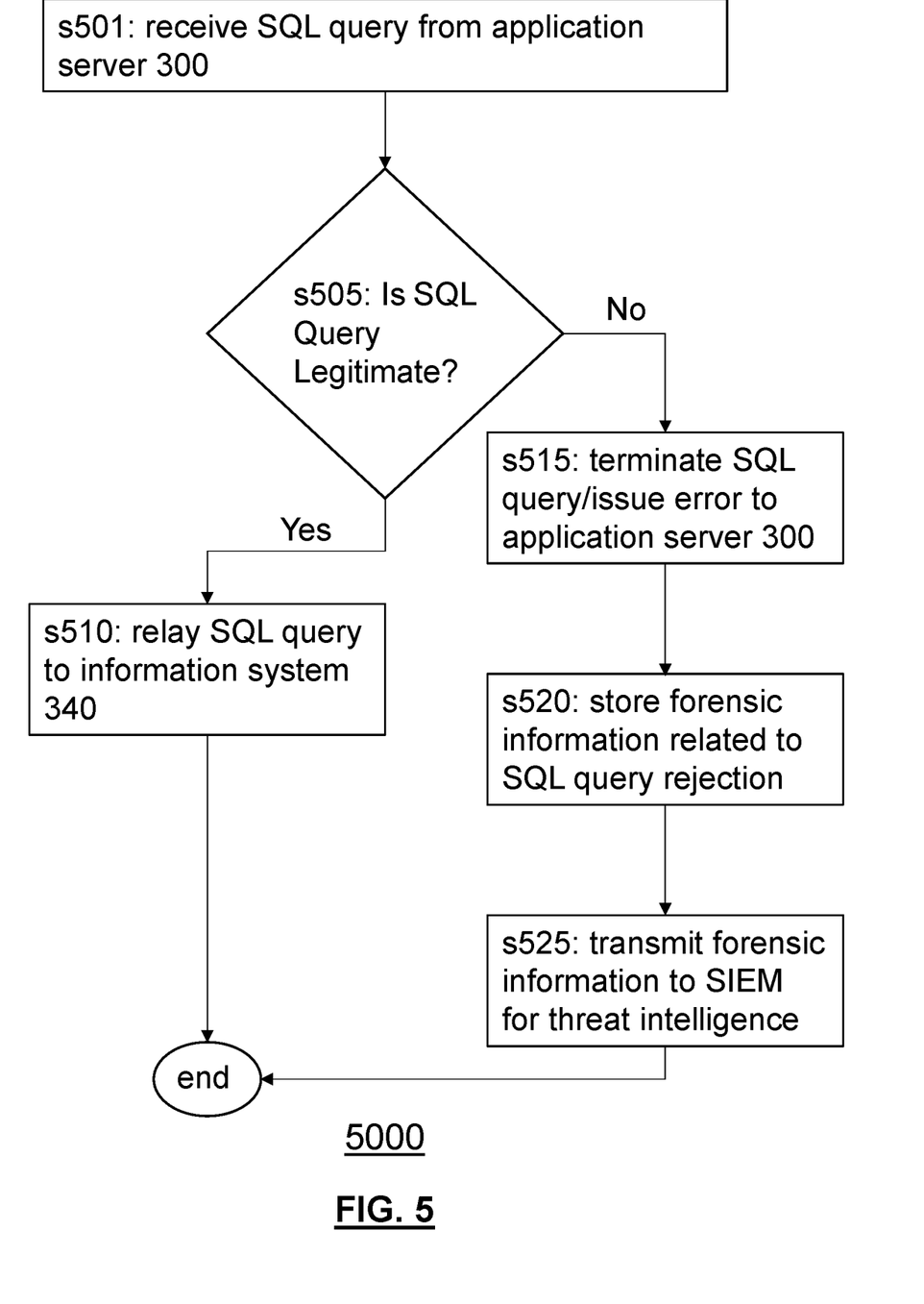
FIG. 5 is a flow diagram illustrating a process for monitoring operational database queries to determine whether a query is legitimate during an operational mode for a database proxy analysis apparatus according to an exemplary embodiment of the present disclosure.

FIG. 5 is a flow diagram of an operational database query monitoring process 5000 that functionally corresponds to processes 2000 and 3000 illustrated in FIGS. 2 and 3, respectively. Process 5000 is executed at database proxy analysis apparatus 101 for all applications at application server 300 that have undergone a training mode initialization. As shown in FIG. 5, process 5000 initiates with step s501, where database proxy analysis apparatus 101 receives an operational database (SQL) query from an application that is executed at application server 300. Next, at step s505, database proxy analysis apparatus 101 determines whether the received operational database query is legitimate. According to an exemplary embodiment, step s505 includes generating a GUID for the received operational database query based on a checksum value and a predetermined hashing algorithm. The generated GUID is compared against database query unique identification library 600 for a matched entry. According to an exemplary embodiment, once the generated GUID is matched to an entry in the database query unique identification library 600, circumstantial parameters for the received operational database query are further compared against legitimate circumstantial parameters that are stored in memory 115 and associated with the matched GUID entry from database query unique identification library 600. If the circumstantial parameters for the received operational database query match stored entries in memory 115 associated with the matched GUID entry, then the received operational database query is deemed to be legitimate.

If the received operational database query is determined to be legitimate ("Yes"), process 5000 proceeds to step s510, where database proxy analysis apparatus 101 relays the operational database query to information system 340 for processing. Step s510 corresponds to step s220 of process 2000 shown in FIG. 2. Process 5000 is then completed and terminates.

If, however, the received operational database query is determined to be illegitimate ("No"), process 5000 proceeds to step s515, where database proxy analysis apparatus 101 terminates the operational database query. Step s515 corresponds to step s320 of process 3000 shown in FIG. 3. In other words, the received operational database query is prevented from reaching information system 340. In embodiments, step s515 can include returning an error message to application server 300.

Next, at step s520, database proxy analysis apparatus 101 records the illegitimate query and the circumstantial parameters related to the query as forensic information in memory 115. In embodiments, forensic information can be stored in the form of a log file. Process 5000 then concludes with transmitting the recorded forensic information to a SIEM for threat intelligence and assessment. According to an exemplary embodiment, step s525 is performed in conjunction with step s520. However, in embodiments, forensic information can instead be transmitted to the SIEM on a periodic basis in a log file and not upon every determination of an illegitimate database query.

According to an exemplary embodiment, database proxy analysis apparatus 101 further incorporates an exception mode that takes place when minor modifications (or "updates") are implemented/introduced in the application query logic at application server 300. During an implementation period of such minor modifications to an application, rejected SQL queries associated with an updated application code portion are forward by database proxy analysis apparatus 101 to an SQL Proxy Analyzer Administrator (not shown) for an exception confirmation. The updated application code portion can be identified via API 505 at step s310 of FIG. 3, where an update flag is incorporated to application code 510 when the minor modifications are implemented at application server 300. When a match failure at step s315 is identified as being associated with an updated/modified code portion, the corresponding query is forwarded to the Administrator for confirmation. Upon confirmation by the Administrator, an "exception" is created and added to the "dictionary library"—i.e., database query unique identification library 600. Advantageously, the exception mode avoids false positives and enables legitimate new queries to be executed for an application without business impact.

According to an exemplary embodiment of the present disclosure, when an application is substantially revised such that a significant number of SQL queries are expected to be changed, a "drain mode" is executed at database proxy analysis apparatus 101. In the "drain mode," data associated with the revised application maintained within the database query unique identification library 600 of the SQL Proxy analyzer 101 is flushed. A backup profile of the application is created in memory 115 and flushed historical data is maintained for future cross checking. Table 2 below illustrates a backup query entry for a revised application, where a GUID, Application Name, and corresponding valid queries are stored for subsequent analysis and cross referencing.

TABLE 2

| GUID | Application Name | SQL Queries White-listed (stored in XML or JSON format) |
|---|---|---|
| 1dfmm3eq_3 | SALES SYSTEM | \<Customers\><br>\<CustomerName="Emad Mousa" Customer |

TABLE 2-continued

| GUID | Application Name | SQL Queries White-listed (stored in XML or JSON format) |
|---|---|---|
| | | ID="1267"\><br>\</Customer\><br>\</Customers\> |

After the "drain mode" is completed, database proxy analysis apparatus 101 re-initializes the revised application with a "population mode" process 1000.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A proxy apparatus for analyzing database queries in a secure network, comprising:
   a computer network interface to the secure network;
   one or more processing devices operatively connected to the computer network interface; and
   one or more memory storage devices operatively connected to the one or more processing devices and having stored thereon machine-readable instructions that cause the one or more processing devices, when executed, to:
      receive, in an initial training mode, a plurality of training database queries from one or more computing apparatuses in the secure network via the computer network interface;
      identify at least a query source, a destination database, and a valid-query code for each of the plurality of training database queries, said valid-query code being identified based on one or more predetermined code libraries;
      assign a unique identifier for each unique valid-query code identified from the plurality of training database queries, said unique identifier being generated based at least upon a respective first checksum value corresponding to the each unique valid-query code and a predetermined algorithm;
      record, in the one or more memory storage devices, the assigned unique identifier, along with one or more unique combinations of the query source and the destination database associated with the each unique valid-query code, to a valid-query library;
      receive, in an operational mode, an operational database query from the secure network via the computer network interface;
      generate an identifier for the received operational database query based at least upon a second checksum value corresponding to a query code of the received operational database query and the predetermined algorithm;
      identify a source and a destination of the received operation database query;
      compare the generated identifier, the identified source, and the identified destination to the valid-query library;
      when the comparison fails to match any entries in the valid-query library, terminate the operational database query;
      when the comparison matches an entry in the valid-query library, relay the received operational database query based on the destination identification via the computer network interface;
      identify, in an exception mode, one or more rejected queries associated with an updated application code portion; and
      record, in the exception mode, one or more updated unique identifiers corresponding to the one or more rejected queries to the valid-query library,
      wherein the comparison comprises comparing a subsequently generated identifier of a subsequent operational database query associated with the updated application code portion to the one or more updated unique identifiers.

2. The proxy apparatus of claim 1, wherein the processor configured to identify the valid-query code for each of the plurality of training database queries is further configured to:
   generate an application programming interface (API) to an application at the one or more computing apparatuses corresponding to the respective training database query;
   scan an application code portion associated with the respective training database query via the generated API;
   retrieve the one or more predetermined code libraries; and
   construct the valid-query code based on the scanned application code portion and the retrieved one or more predetermined code libraries.

3. The proxy apparatus of claim 1, wherein the processor configured to generate the identifier for the received operational database query is further configured to:
   generate an application programming interface (API) to an application corresponding to the received operational database query;
   scan an application code portion associated with the received operational database query via the generated API;
   retrieve the one or more predetermined code libraries; and
   construct the query code of the received operational database query based on the scanned application code portion and the retrieved one or more predetermined code libraries.

4. The proxy apparatus of claim 1, wherein the proxy apparatus comprises one or more machine readable instructions stored on the one or more memory storage devices for causing, when executed, the one or more processing devices to:
   when the comparison fails to match any entries in the valid-query library, record, in a rejected query log, forensic information on the received operational database query, the forensic information comprising the query code, the identified source, and the identified destination of the received operation database query; and
   transmit the rejected query log to a threat assessment apparatus.

5. The proxy apparatus of claim 4, wherein the identified source comprises an internet protocol (IP) address and an account name associated with the received operation database query.

6. The proxy apparatus of claim 1, wherein the predetermined algorithm is a hashing algorithm for hashing the respective first checksum value and the second checksum value to generate a respective signature for said unique identifier for said each unique valid-query code and said identifier for the received operational database query.

7. A method of a proxy apparatus for analyzing database queries in a secure network, comprising:
  receiving, by the proxy apparatus in an initial training mode, a plurality of training database queries from one or more computing apparatuses in the secure network via a computer network interface;
  identifying, by the proxy apparatus, at least a query source, a destination database, and a valid-query code for each of the plurality of training database queries, said valid-query code being identified based on one or more predetermined code libraries;
  assigning, by the proxy apparatus, a unique identifier for each unique valid-query code identified from the plurality of training database queries, said unique identifier being generated based at least upon a respective first checksum value corresponding to the each unique valid-query code and a predetermined algorithm;
  recording, in one or more memory storage devices, the assigned unique identifier, along with one or more unique combinations of the query source and the destination database associated with the each unique valid-query code, to a valid-query library;
  receiving, by the proxy apparatus in an operational mode, an operational database query from the secure network via the computer network interface;
  generating, by the proxy apparatus, an identifier for the received operational database query based at least upon a second checksum value corresponding to a query code of the received operational database query and the predetermined algorithm;
  identifying, by the proxy apparatus, a source and a destination of the received operation database query;
  comparing, by the proxy apparatus, the generated identifier, the identified source, and the identified destination to the valid-query library;
  when the comparing fails to match any entries in the valid-query library, terminating, by the proxy apparatus, the operational database query;
  when the comparing matches an entry in the valid-query library, relaying, by the proxy apparatus, the received operational database query based on the destination identification via the computer network interface;
  identifying, by the proxy apparatus in an exception mode, one or more rejected queries associated with an updated application code portion; and
  recording, by the proxy apparatus in the exception mode, one or more updated unique identifiers corresponding to the one or more rejected queries to the valid-query library, wherein
  the comparing compares a subsequently generated identifier of a subsequent operational database query associated with the updated application code portion to the one or more updated unique identifiers.

8. The method of claim 7, wherein
the identifying of the valid-query code for each of the plurality of training database queries comprises:
  generating an application programming interface (API) to an application at the one or more computing apparatuses corresponding to the respective training database query;
  scanning an application code portion associated with the respective training database query via the generated API;
  retrieving the one or more predetermined code libraries; and
  constructing the valid-query code based on the scanned application code portion and the retrieved one or more predetermined code libraries.

9. The method of claim 7, wherein
the generating of the identifier for the received operational database query comprises:
  generating an application programming interface (API) to an application corresponding to the received operational database query;
  scanning an application code portion associated with the received operational database query via the generated API;
  retrieving the one or more predetermined code libraries; and
  constructing the query code of the received operational database query based on the scanned application code portion and the retrieved one or more predetermined code libraries.

10. The method of claim 7, further comprising:
  when the comparing fails to match any entries in the valid-query library, recording, in a rejected query log, forensic information on the received operational database query, the forensic information comprising the query code, the identified source, and the identified destination of the received operation database query; and
  transmitting, by the proxy apparatus, the rejected query log to a threat assessment apparatus.

11. The method of claim 10, wherein the identified source comprises an internet protocol (IP) address and an account name associated with the received operation database query.

12. The method of claim 7, wherein the predetermined algorithm is a hashing algorithm for hashing the respective first checksum value and the second checksum value to generate a respective signature for said unique identifier for said each unique valid-query code and said identifier for the received operational database query.

13. A proxy apparatus for analyzing database queries in a secure network, comprising:
  a computer network interface to the secure network;
  one or more processing devices operatively connected to the computer network interface; and
  one or more memory storage devices operatively connected to the one or more processing devices and having stored thereon machine-readable instructions that cause the one or more processing devices, when executed, to:
    receive, in an initial training mode, a plurality of training database queries from one or more computing apparatuses in the secure network via the computer network interface;
    identify at least a query source, a destination database, and a valid-query code for each of the plurality of training database queries, said valid-query code being identified based on one or more predetermined code libraries;
    assign a unique identifier for each unique valid-query code identified from the plurality of training database queries, said unique identifier being generated based at least upon a predetermined algorithm;
    record, in the one or more memory storage devices, the assigned unique identifier, along with one or more unique combinations of the query source and the destination database associated with the each unique valid-query code, to a valid-query library;

receive, in an operational mode, an operational database query from the secure network via the computer network interface;
generate an identifier for the received operational database query based at least upon a query code of the received operational database query;
identify a source and a destination of the received operation database query;
compare the generated identifier, the identified source, and the identified destination to the valid-query library;
when the comparison fails to match any entries in the valid-query library, terminate the operational database query; and
when the comparison matches an entry in the valid-query library, relay the received operational database query based on the destination identification via the computer network interface,
wherein for assigning the unique identifier for the each unique valid-query code or for generating the identifier for the received operational database query, the proxy apparatus comprises one or more machine readable instructions stored on the one or more memory storage devices for causing, when executed, the one or more processing devices to:
generate an application programming interface (API) to an application at the one or more computing apparatuses corresponding to the respective training database query or the respective operational database query;
scan an application code portion associated with the respective training database query or the operational database query via the generated API;
retrieve the one or more predetermined code libraries; and
construct the valid-query code or the query code based on the scanned application code portion and the retrieved one or more predetermined code libraries.

14. A method of a proxy apparatus for analyzing database queries in a secure network, comprising:
receiving, in an initial training mode, a plurality of training database queries from one or more computing apparatuses in the secure network via the computer network interface;
identifying at least a query source, a destination database, and a valid-query code for each of the plurality of training database queries, said valid-query code being identified based on one or more predetermined code libraries;
assigning a unique identifier for each unique valid-query code identified from the plurality of training database queries, said unique identifier being generated based at least upon a predetermined algorithm;
recording, in the one or more memory storage devices, the assigned unique identifier, along with one or more unique combinations of the query source and the destination database associated with the each unique valid-query code, to a valid-query library;
receiving, in an operational mode, an operational database query from the secure network via the computer network interface;
generating an identifier for the received operational database query based at least upon a query code of the received operational database query;
identifying a source and a destination of the received operation database query;
comparing the generated identifier, the identified source, and the identified destination to the valid-query library;
when the comparison fails to match any entries in the valid-query library, terminating the operational database query; and
when the comparison matches an entry in the valid-query library, relaying the received operational database query based on the destination identification via the computer network interface,
wherein for assigning the unique identifier for the each unique valid-query code or for generating the identifier for the received operational database query, the method comprises:
generating an application programming interface (API) to an application at the one or more computing apparatuses corresponding to the respective training database query or the respective operational database query;
scanning an application code portion associated with the respective training database query or the operational database query via the generated API;
retrieving the one or more predetermined code libraries; and
constructing the valid-query code or the query code based on the scanned application code portion and the retrieved one or more predetermined code libraries.

* * * * *